(12) United States Patent
Golob

(10) Patent No.: US 11,454,937 B2
(45) Date of Patent: Sep. 27, 2022

(54) AUTOMATIC ELECTRICAL SHUT-OFF DEVICE

(71) Applicant: Carrier Corporation, Palm Beach Gardens, FL (US)

(72) Inventor: Michael Lawrence Golob, Sarasota, FL (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 163 days.

(21) Appl. No.: 16/754,039

(22) PCT Filed: Oct. 8, 2018

(86) PCT No.: PCT/US2018/054841
§ 371 (c)(1),
(2) Date: Apr. 6, 2020

(87) PCT Pub. No.: WO2019/074836
PCT Pub. Date: Apr. 18, 2019

(65) Prior Publication Data
US 2020/0326664 A1 Oct. 15, 2020

Related U.S. Application Data

(60) Provisional application No. 62/572,252, filed on Oct. 13, 2017.

(51) Int. Cl.
*G05B 9/02* (2006.01)
*H04B 1/38* (2015.01)

(52) U.S. Cl.
CPC .................. *G05B 9/02* (2013.01); *H04B 1/38* (2013.01)

(58) Field of Classification Search
CPC .................................... G05B 9/02; H04B 1/38
See application file for complete search history.

(56) References Cited

U.S. PATENT DOCUMENTS 3,500,085 A * 3/1970 Smith .................. H02K 11/044
56/10.8
4,221,206 A 9/1980 Haas
(Continued)

FOREIGN PATENT DOCUMENTS

CA 2788449 A1 2/2014
GB 2505213 A1 2/2014
(Continued)

OTHER PUBLICATIONS

International Search Report and Written Opinion for PCT Application No. PCT/US2018/054841, dated Dec. 4, 2018, pp. 1-16.

*Primary Examiner* — Daniel C Puentes
(74) *Attorney, Agent, or Firm* — Cantor Colburn LLP

(57) ABSTRACT

An electrical shut-off device (10) is provided and includes a housing (11), first and second inputs (12, 13) and an output disposed on the housing, a transmission/reception (T/R) module (14) coupled to the first input, an input device (15) coupled to the second input, an electrical device coupled to the output and a processor (20). The processor is in signal communication with the T/R module, the input device and the electrical device via the first and second inputs and the output, respectively. The processor is configured to issue an instruction via the T/R module and to take an action relative to the electrical device responsive to a signal being received by the T/R module and to take an additional action in accordance with an actuation state of the input device.

18 Claims, 3 Drawing Sheets

(56) References Cited

U.S. PATENT DOCUMENTS

| | | |
|---|---|---|
| 4,659,909 A | 4/1987 | Knutson |
| 5,239,980 A | 8/1993 | Hilt et al. |
| 5,576,739 A | 11/1996 | Murphy |
| 5,670,074 A | 9/1997 | Kass et al. |
| 5,752,818 A | 5/1998 | Forster |
| 5,793,296 A | 8/1998 | Lewkowicz |
| 5,815,086 A | 9/1998 | Ivie et al. |
| 5,838,243 A | 11/1998 | Gallo |
| 5,896,089 A | 4/1999 | Bowles |
| 6,040,636 A | 3/2000 | Dicrose |
| 6,057,755 A | 5/2000 | Phillips |
| 6,339,379 B1 | 1/2002 | Argus et al. |
| 6,743,091 B2 | 6/2004 | Meneely, Jr. |
| 6,777,902 B2 * | 8/2004 | Fitzgibbon ............ H02P 25/04 318/266 |
| 6,801,132 B2 | 10/2004 | Clauss et al. |
| 6,989,757 B2 | 1/2006 | Geoffrey J. et al. |
| 7,005,994 B2 | 2/2006 | King |
| 7,102,529 B2 | 9/2006 | Whitney |
| 7,112,059 B2 | 9/2006 | Donnelly |
| 7,154,402 B2 | 12/2006 | Dayoub |
| 7,199,721 B2 | 4/2007 | Shirlee |
| 7,327,246 B2 | 2/2008 | Schoor |
| 7,579,956 B2 | 8/2009 | Chapman, Jr. et al. |
| 7,728,736 B2 | 6/2010 | Leeland et al. |
| 7,817,048 B2 | 10/2010 | Rouse et al. |
| 7,898,427 B1 | 3/2011 | Kim |
| 7,994,928 B2 | 8/2011 | Richmond |
| 8,068,034 B2 | 11/2011 | Shah et al. |
| 8,138,933 B2 | 3/2012 | Crucs |
| 8,214,060 B2 | 7/2012 | Bartels et al. |
| 8,442,515 B2 | 5/2013 | Stump et al. |
| 8,482,884 B2 | 7/2013 | Hennessey, Jr. |
| 8,836,522 B2 | 9/2014 | Thorpe et al. |
| 8,890,034 B2 | 11/2014 | Mishra |
| 8,988,232 B1 | 3/2015 | Sloo et al. |
| 9,030,330 B1 | 5/2015 | Nichols, Jr. |
| 9,053,626 B2 | 6/2015 | Cristoforo |
| 9,444,244 B2 | 9/2016 | Hooper et al. |
| 9,466,195 B1 | 10/2016 | Boyer et al. |
| 9,513,007 B2 | 12/2016 | Kuchta |
| 9,543,945 B2 | 1/2017 | Seigler et al. |
| 9,600,998 B2 | 3/2017 | Mumey |
| 2001/0045895 A1 | 11/2001 | Ellis et al. |
| 2004/0080424 A1 | 4/2004 | Perry et al. |
| 2004/0160329 A1 | 8/2004 | Flanc |
| 2004/0189461 A1 * | 9/2004 | Tice ............ G08B 29/183 340/522 |
| 2005/0264383 A1 * | 12/2005 | Zhang ............ H01R 24/78 335/18 |
| 2006/0044133 A1 | 3/2006 | Lou |
| 2007/0146150 A1 | 6/2007 | Calabrese et al. |
| 2008/0018484 A1 | 1/2008 | Sager |
| 2008/0146895 A1 * | 6/2008 | Olson ............ G16H 40/67 600/301 |
| 2008/0280551 A1 | 11/2008 | Ashworth |
| 2009/0022362 A1 * | 1/2009 | Gagvani ............ G06T 7/254 340/541 |
| 2010/0073174 A1 | 3/2010 | Dufour |
| 2010/0308666 A1 | 12/2010 | Raby |
| 2011/0063101 A1 | 3/2011 | Cristoforo |
| 2011/0170377 A1 | 7/2011 | Legaspi |
| 2011/0187542 A1 | 8/2011 | Dittmer et al. |
| 2012/0325197 A1 | 12/2012 | Legaspi et al. |
| 2013/0021160 A1 | 1/2013 | Sid |
| 2013/0063848 A1 | 3/2013 | Thorpe et al. |
| 2014/0055261 A1 | 2/2014 | Su |
| 2015/0253793 A1 | 9/2015 | Matesa, Jr. |
| 2015/0269821 A1 | 9/2015 | Haynes et al. |
| 2016/0245531 A1 | 8/2016 | Ronk et al. |
| 2016/0260313 A1 | 9/2016 | Thorpe et al. |
| 2016/0300415 A1 * | 10/2016 | Deneen ............ E05F 15/70 |
| 2017/0077693 A1 | 3/2017 | Lermann |
| 2018/0266163 A1 * | 9/2018 | Combe ............ A62C 2/24 |

FOREIGN PATENT DOCUMENTS

| | | |
|---|---|---|
| KR | 101320785 B1 | 10/2013 |
| TW | 201035914 A | 10/2010 |

* cited by examiner

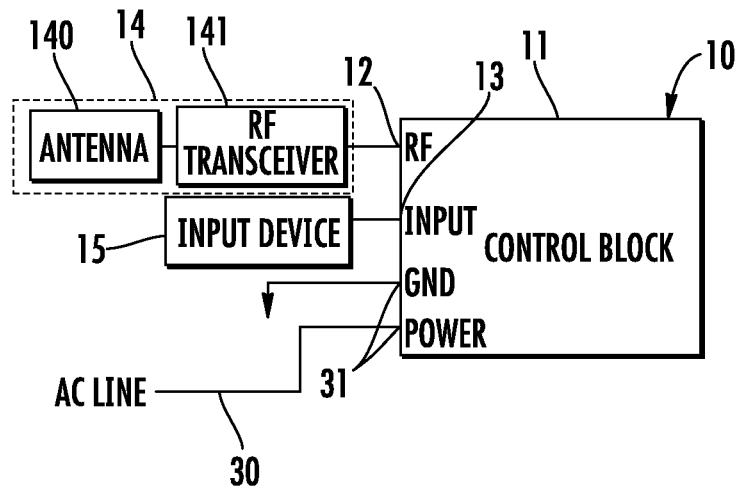
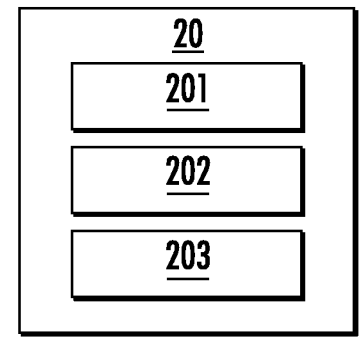
*FIG. 1*
*FIG. 2*
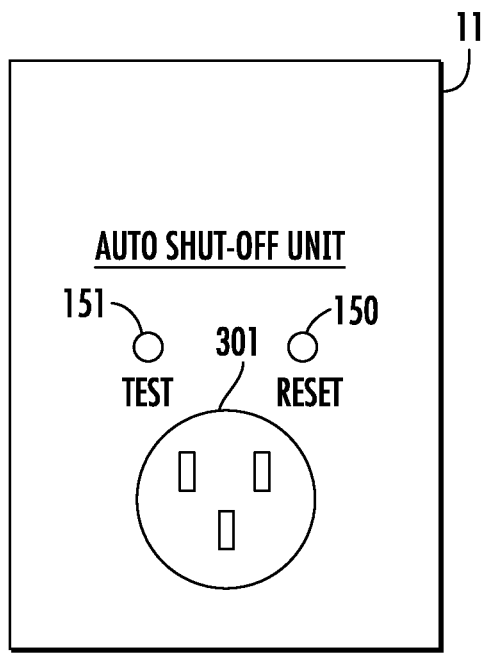
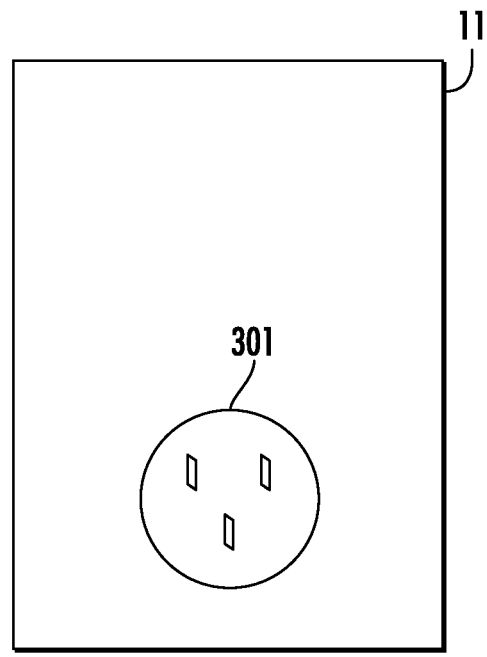
*FIG. 3A*
*FIG. 3B*

AUTOMATIC ELECTRICAL SHUT-OFF DEVICE

CROSS-REFERENCE TO RELATED APPLICATIONS

This application is a National Phase of PCT Application No. PCT/US2018/054841 filed Oct. 8, 2018 which claims the benefit of priority to Provisional Application No. 62/572,252 filed Oct. 13, 2017, the disclosure of which is incorporated herein by reference in its entirety.

BACKGROUND

The following description relates to electrical shut-off devices and, more specifically, to an automatic electrical shut-off device for fire alarm events.

A current method for fire detection is to sound an alarm to evacuate the building in which the fire alarm issued. To this end, buildings have various detectors installed therein to detect conditions that suggest that a fire or other hazardous conditions may be occurring or might be about to start. These detectors are subject to testing and verification that they operate in accordance with certain standards. The standards are often established by separate bodies, such as Underwriter's Laboratories (UL).

Revised underwriter's laboratories (UL) standards UL217-8 and UL268-7 incorporate requirements for detecting cooking fires, such as a "Burger fire." According to the standards, smoke and fire detectors are required to be designed so that they do not issue alarms before 1.5% obscuration occurs (i.e., when 1.5% of the field of view of a sensor of a smoke alarm is obscured by smoke or other by-products of a fire). Thus, since a cooking item, such as a burger patty, typically does not catch on fire until ~2.5% obscuration, the UL standards dictate the principle that if a detector alarmed at 1.5% obscuration there may have been no fire actually occurring and that such an alarm would in effect be a false alarm.

Many apartment buildings and residences have a garage connected to or located underneath the residence. If a driver accidentally closes the garage without shutting off the car and gets distracted while the kids/pets are inside the house, the persons/pets inside may be injured or potentially die from carbon monoxide (CO) poisoning. Moreover, in a residence, if there is a small fire next to an air handler, the smoke may get spread throughout the entire residence, likely causing extended smoke damage which would cost more money to clean up than fire damage otherwise caused by a small fire.

BRIEF DESCRIPTION

According to an aspect of the disclosure, an electrical shut-off device is provided. The electrical shut-off device includes a housing, first and second inputs and an output disposed on the housing, a transmission/reception (T/R) module coupled to the first input, an input device coupled to the second input, an electrical device coupled to the output and a processor. The processor is in signal communication with the T/R module, the input device and the electrical device via the first and second inputs and the output, respectively. The processor is configured to issue an instruction via the T/R module and to take an action relative to the electrical device responsive to a signal being received by the T/R module and to take an additional action in accordance with an actuation state of the input device.

In accordance with additional or alternative embodiments, the housing is grounded and receptive of power from an alternating current (AC) line.

In accordance with additional or alternative embodiments, the T/R module is communicative via at least one of microwave, radio frequency (RF), and Infrared (IR) networks.

In accordance with additional or alternative embodiments, the T/R module includes an antenna and a transceiver and is communicative with external devices via a wireless protocol.

In accordance with additional or alternative embodiments, the input device includes at least one of a reset button and a test button.

In accordance with additional or alternative embodiments, the output and the electrical device are provided as respective pluralities of outputs and electrical devices.

In accordance with additional or alternative embodiments, the electrical device is coupled to a garage door opener.

In accordance with additional or alternative embodiments, the electrical device is coupled to a ventilation unit.

In accordance with additional or alternative embodiments, the electrical device includes at least one of a T/R module, a switch and a relay and is receptive of power from an alternating current (AC) line.

In accordance with additional or alternative embodiments, the processor is configured to periodically communicate with a network via the T/R module and to determine that the signal is an alarm in accordance with the signal being asynchronously received from the network.

In accordance with additional or alternative embodiments, the additional action includes one of resuming periodic communications with a network via the T/R module or controlling operations of external devices.

According to yet another aspect of the disclosure, a method of operating an electrical shut-off device is provided. The electrical shut-off device includes a transmission/reception (T/R) module, which is communicative according to a wireless protocol via at least one of radio frequency (RF) and Infrared (IR) networks, and an input device. The method includes periodically communicating with the at least one of the RF and IR networks according to the wireless protocol via the TR module, receiving an asynchronous signal from the at least one of the RF and IR networks according to the wireless protocol via the TR module, identifying the asynchronous signal as an alarm, issuing an instruction to an external electrical device to take an action according to the wireless protocol via the T/R module responsive to receipt of the asynchronous signal and identification thereof as an alarm and taking an additional action in accordance with an actuation state of the input device.

In accordance with additional or alternative embodiments, the identifying includes determining that the asynchronous signal is received asynchronously relative to periodic communications.

In accordance with additional or alternative embodiments, the issuing of the instruction includes issuing an instruction to the external electrical device to shut down.

In accordance with additional or alternative embodiments, the issuing of the instruction includes issuing an operational instruction to the external electrical device.

In accordance with additional or alternative embodiments, the taking of the additional action includes controlling operations of additional external devices.

In accordance with additional or alternative embodiments, the taking of the additional action includes determining the actuation state of the input device and resuming periodic communications in an event the input device is determined to have been actuated.

In accordance with additional or alternative embodiments, the taking of the additional action includes controlling operations of additional external devices.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 1 is a schematic diagram of an electrical shut-off device in accordance with embodiments;

FIG. 2 is a schematic diagram of components of a processor of the electrical shut-off device of FIG. 1;

FIG. 3A is a front view of an illustration of the electrical shut-off device of FIGS. 1 and 2;

FIG. 3B is a rear view of an illustration of the electrical shut-off device of FIGS. 1 and 2;

Figure 4:
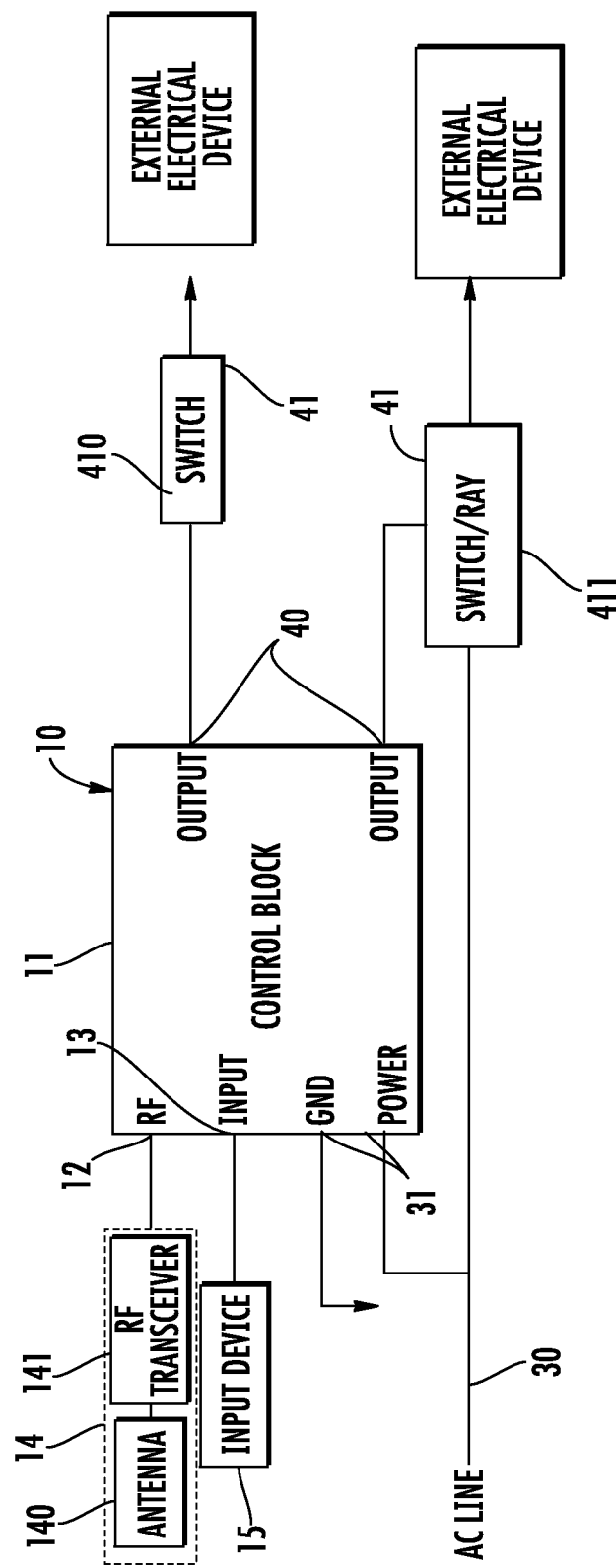
FIG. 4 is a schematic diagram of an electrical shut-off device in accordance with further embodiments.

These and other advantages and features will become more apparent from the following description taken in conjunction with the drawings.

DETAILED DESCRIPTION

Conventional devices listen for certain audible frequencies, which may be subject to false alarms. The electrical shut-off device described herein has extra features and communicates with a network protocol and so provides for added robustness. The electrical shut-off device will be useful in residential buildings, such as apartments, condominiums and townhomes, as well as office buildings and other commercial buildings where such a device may potentially lower insurance costs and where homeowners or building administrators may desire added protection.

As will be described below, an electrical shut-off device is provided and can be added to any wired electrical connection by which an electrical device may be powered such as, for example, by integration into or by being plugged into a wall socket, or by hard wiring to a grid. It may be expected, although not limited to such an application, that an electrical device with a high risk of overheating, hazardous gas production and/or of causing a fire (e.g., a space heater, oven, power tool, engine, etc.) would be connected to the electrical shut-off device. If the electrical shut-off device receives an indication of an alarm event from, for example, a carbon monoxide (CO), smoke or other hazardous condition detector, the electrical shut-off device may de-power the connected electrical device. The electrical shut-off device may communicate with external devices by way of a proprietary wireless protocol. In some embodiments the electrical shut-off device may transmit a signal to another device which may take another action in response to receiving the signal. In one embodiment, the other device may, for example, directly or indirectly control a garage door so that the garage door opens. The electrical shut-off device may also directly or indirectly communicate with a thermostat to turn off all or part of a ventilation system when the electrical shut-off device receives an indication of a smoke or other hazardous condition alarm. Additional exemplary embodiments may include, for example, turning on lights during a night alarm event, and unlocking doors which may aid elderly persons and children attempting to exit the building.

With reference to FIGS. 1 and 2 and to FIGS. 3A and 3B, an electrical shut-off device 10 is provided. The electrical shut-off device 10 includes a housing 11, a first input 12 disposed on the housing 11, a second input 13 disposed on the housing 11, a transmission/reception (T/R) module 14 coupled to the first input 12, an input device 15 coupled to the second input 13, and a processor 20. The processor 20 may be, but is not required to be, accommodated within the housing 11 and is in signal communication with the T/R module 14 and the input device 15 via the first and second inputs 12 and 13, respectively.

In accordance with embodiments, the housing 11 is grounded and is receptive of power to power the processor 20 and other electrical elements from an alternating current (AC) line 30 at plugs 31. To this end, the housing 11 may include plug elements 301 (see FIGS. 3A and 3B) on its forward and rear face that can be receptive of plugs. In alternate embodiments, direct current (DC) power may be supplied through line 30. In alternate embodiments, line 30 may be hard-wired to wires 31 rather than connected through plugs.

In accordance with embodiments, the T/R module 14 may communicate wirelessly via at least one of radio frequency (RF), Infrared (IR), and microwave networks. In any case, the T/R module 14 may include an antenna 140 and a transceiver 141 interposed between the antenna 140 and the first input 12. The T/R module 14 may communicate according to a communication protocol or, more particularly, according to a proprietary communication protocol. In some embodiments, the T/R module 14 may communicate according to a wireless communication protocol or, more particularly, according to a proprietary wireless communication protocol. Exemplary wireless protocols may include, for example, Bluetooth, Zigbee, Wifi, or a proprietary non-standard protocol. In some alternative embodiments, the T/R module 14 may communicate via a wired network and include an input/output port (not shown), or a powerline internet connection to power line 30 through power connection 31. In some alternative embodiments, the T/R module 14 may communicate via a wired network such as Ethernet or a powerline network.

As shown in FIG. 2, the processor 20 may include a processing circuit 201, a memory unit 202 and a networking unit 203 by which the processing circuit 201 is communicative with the first and second inputs 12 and 13 and with external devices. The memory unit 202 has executable instructions stored thereon, which, when executed by the processing circuit 201, cause the processing circuit 201 to operate generally as described herein. In any case, the processor 20 is configured to issue an instruction via the T/R module 14 to an external device or, more particularly, to issue an instruction to an external electrical device via the T/R module 14 or another communication element in response to a signal being received by the T/R module 14. The processor 20 is further configured to take an additional action in accordance with an actuation state of the input device 15.

In accordance with embodiments, the processor 20 is configured to periodically communicate with a network (e.g., an RF network) via the T/R module 14 and to determine that the received signal is an alarm in accordance with the received signal being asynchronously received from the network. The additional action taken by the processor 20 may include one of resuming periodic communications with the network via the T/R module 14 in an event the input device 15 has been actuated or controlling/continuing to control operations of external devices in an event the input device 15 has not yet been actuated.

In accordance with further embodiments and, as shown in FIGS. 3A and 3B, the input device 15 may be provided as a user input device and may include at least one of a reset button 150 and a test button 151. The reset button 150 may be actuatable relative to the housing 11 to reset an operational status of the processor 20 or the electrical shut-off device 10 as a whole. The test button 151 may be actuatable relative to the housing 11 in order to cause the processor 20 to run or execute a test. In some embodiments, buttons 150 and/or 151 may have alternative functions depending on one or a combination of duration of actuation and number of actuations of the button. For example, alternative functions may include, but not be limited to, connection to other devices through a proprietary and/or a standardized network, including connection to the internet (e.g. through a hub, control panel, or directly), or to a smartphone which may interact with and/or configure the electrical shut-off device 10 via an app or a website, or to a laptop which may interact with and/or configure the electrical shut-off device 10 via an application, website, or other method. In some embodiments, receipt of a signal may cause processor 20 to simulate actuation of the input device 15, e.g. an external device such as a smartphone, control panel, or hub in communicative connection with electrical shut-off device 10 may send a signal received by the T/R module 14 indicating an action to be taken as if input device 15 had been actuated.

With reference to FIG. 4, further embodiments of the electrical shut-off device 10 will now be described but features of these further embodiments that have already been described will not be described again except as necessary to describe additional features.

As shown in FIG. 4, the electrical shut-off device 10 may include at least one or more outputs 40 and at least one or more electrical devices 41. In some embodiments, as shown in FIG. 4, the at least one or more electrical devices 41 may include or be provided as one or more first electrical devices 410 which are coupled to a single output 40. In some embodiments, also as shown in FIG. 4, the at least one or more electrical devices 41 may include or be provided as one or more second electrical devices 411 which are coupled to a single output 40 and which receive power from the AC line 30. Some embodiments may include none, one, or more first electrical devices 410, and some embodiments may include one or more second electrical devices 411.

In some embodiments, each of the first electrical devices 410 may include or be provided as a switch element, a transmitter or a T/R module that can be commanded by the processor 20 to issue operational instructions to an external electrical device. In some embodiments, the transmitter may include or be provided as a wireless transmitter and may include or be provided as an RF, IR, or microwave transmitter. In some embodiments, the transmitter may include or be provided as a wired transmitter and may be connected to an external electrical device by either direct communicative connection or indirectly through a network such as an Ethernet or a powerline network. The T/R module may be a standalone component that is similar to the T/R module 14 or may be a component of the T/R module 14. However connected, communications between each first electrical device 410 and the corresponding output 40 as well as communications between the first electrical device 410 and the external electrical device (e.g., a garage door opener, a ventilation unit, etc.) to which the first electrical device 410 is coupled may be wired or wireless. In the latter case, especially where the first electrical device 410 is the transmitter or the T/R module, the wireless communications may be provided via a wireless network in accordance with a wireless protocol as discussed above.

Each of the second electrical devices 411 may include or be provided as a switch or a relay, which is coupled to a single output 40, which receives power from the AC line 30 and which can be commanded by the processor 20 to provide an external electrical device with power from the AC line 30 or to withhold the power from the external electrical device. In some embodiments, the second electrical devices 411 may be capable of communications between each second electrical device 411 and the corresponding output 40 as well as communications between the second electrical device 411 and the external electrical device (e.g., a stovetop or other appliance such as a cooking appliance) to which the second electrical device 411 is coupled and such communications may be wired or wireless as described above with reference to the first electrical devices 410.

In an exemplary case, the electrical shut-off device 10 is communicative with a smoke detector via the T/R module 14 using a communications protocol. The smoke detector may be proximate to a stovetop or other cooking appliance. In an exemplary case, the electrical shut-off device 10 includes at least one output 40, at least a second electrical device 411 that is communicative with the at least one output 40 and an external electrical device, such as a stovetop, whereby the external electrical device or in this case the stovetop receives power from the AC line 30 via the second electrical device 411.

In an exemplary case, the electrical shut-off device 10 is similarly communicative with a CO detector located proximate to equipment which may produce CO such as in a garage (which may contain automotive or other equipment capable of producing CO) or utility room (which may contain a heating device such as a furnace, or other equipment capable of producing CO). In an exemplary case, the electrical shut-off device 10 includes at least one output 40, a first electrical device 410 that is communicative with an output 40 and an external device, such as a garage door opener.

In an exemplary scenario, when the electrical shut-off device 10 is powered up (e.g., by being plugged into the AC line 30), the electrical shut-off device 10 will periodically search for, and if located connect with, external devices capable of hazard detection (such as a wireless or wired smoke detector) and also capable of external wired or wireless inter-device communication to which it may be directly or indirectly (e.g. through a control panel or hub) communicatively connected via the T/R module 14. In some embodiments, once a communication channel is established, both the electrical shut-off device 10 and the external detection devices may communicate via a set schedule, which may be pre-set or may be communicated between the devices during an initialization procedure, or configured via a third device such as a control panel, hub, smartphone, or hard-wired configurator, or other such device. Such scheduled communication may reduce power usage, the likelihood of communications interference, or have other advantages. In some embodiments, communication may not be scheduled but electrical shut-off device 10 may periodically determine the communications status of external detection devices, e.g. check in with those devices to see if they are in a trouble status such as alert or alarm.

Once communication between the electrical shut-off device 10 and an external detection device has been established, during periodic check-ins the electrical shut-off device 10 may receive a signal indicating an alarm condition or other event. In one embodiment, for example, if the T/R module 14 receives an asynchronous signal from a detection device on the wired or wireless network, the processor 20 may interpret the signal as an alarm indicating a hazardous condition, such as a smoke alarm or a CO alarm. In some embodiments, the nature of the hazardous condition, e.g. smoke or CO being detected, may determine a response of the electrical shut-off device 10, and in some embodiments the electrical shut-off device 10 may take the same action regardless of the nature of the hazardous condition.

For example, in some embodiments, if the alarm signal is determined to originate from a smoke alarm the processor 20 may determine that the smoke is coming from the stovetop and may command the second electrical device 411 to cut off power from the stovetop which may prevent a fire from starting or developing.

On the other hand, if the signal is a CO alarm the processor 20 may determine that the hazardous condition originates from the garage and may command the first electrical device 410 to instruct the garage door opener to open which may ventilate the garage.

In a similar exemplary embodiment, if the signal is a CO alarm the processor 20 may determine that that the hazardous condition originates from the garage and may command either one, or in some embodiments, a pair of first electrical devices 410 to instruct the garage door opener to open in order to ventilate the garage, and also to instruct the ventilation unit to shut down so as to prevent CO from being transported throughout the building. Note that in some exemplary embodiments alternative methods may be used where devices are not capable of communication, for example the output 40 may be wired directly to a garage door opener, and an instruction to open the garage door may cause the output 40 to be set "high" (where another state of the output 40 is "low"), which will cause the contacts of the garage door opener to short out, causing the garage door to open.

The processor 20 may also send one or more signals to additional external electrical devices (e.g., light and doors) to command them to engage and/or disengage, e.g. turn on and unlock. In some embodiments, such additional external electrical devices may be directly communicatively connected to electrical shut-off device 10, and in some embodiments additional external electrical devices may be indirectly communicatively connected to electrical shut-off device 10, e.g. through a local hub or control panel, or through a cloud network, or some combination thereof. In an additional example, if an event such as an alarm or alert has been received and the input device 15 is actuated the processor 20 may determine the input device 15 has been actuated and thus return some or all of external electrical devices to their respective status as it was prior to the alert (which may be configurable, e.g., the A/C may be turned on and the garage door closed, but the doors may remain unlocked if so configured). The processor 20 may then return the electrical shut-off device 10 to a normal operating status such that periodic communications with the external detection devices resume.

Figure 5:
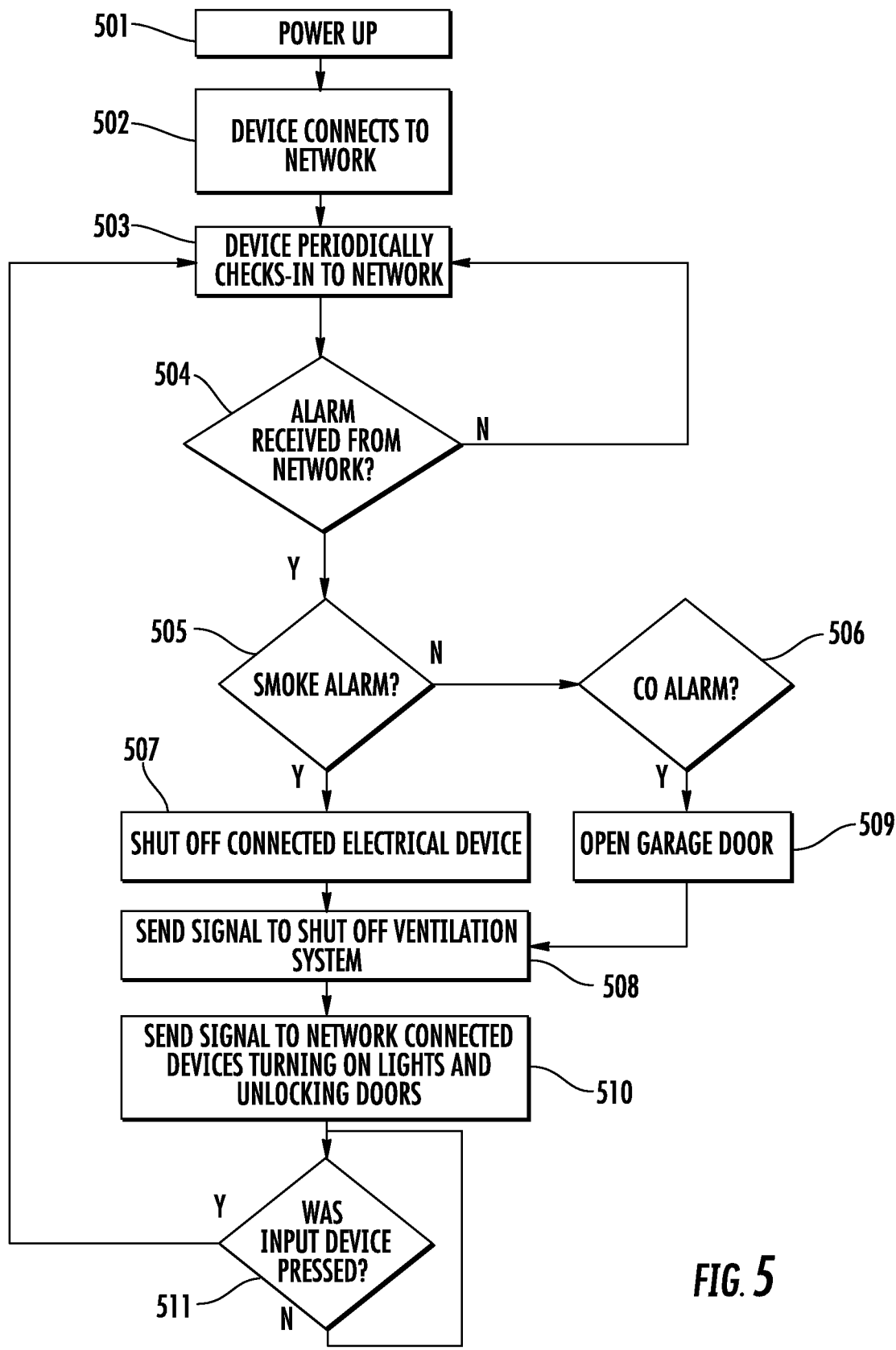
FIG. 5 is a flow diagram illustrating a method of operation of an electrical shut-off device in accordance with embodiments.

With reference to FIG. 5, a method of operating the electrical shut-off device 10 is provided. As shown in FIG. 5, the method includes powering up (block 501), connecting with a network (block 502), such as a wired or wireless network (note that as discussed above, connection to the network may involve sub-steps or repetition not shown in this diagram), and periodically communicating with the network according to the wired or wireless protocol via the TR module 14 (block 503). The method further includes receiving an event signal from the network (block 504) which in the example shown may be identifiable as a smoke alarm (block 505) or a CO alarm (block 506). Note that in the example shown in blocks 505 and 506, the electrical shut-off device 10 first determines if the alarm is a smoke alarm and then determines if it is a CO alarm, but in some embodiments the order may be reversed, or in other exemplary embodiments the determination may be based upon a lookup table or other method to determine the type of alarm based on the received signal, or in yet further embodiments the type of event may be irrelevant and the same actions taken for every type of event.

In the case of the alarm being identifiable as a smoke alarm as in block 505 or as a CO alarm in block 506, the method includes issuing an instruction (e.g., issuing an operational instruction to shut off an electrical device by cutting off its power, issuing an operational instruction to shut off an electrical ventilation system by sending a shut-off signal thereto or in another example, issuing an operational instruction to open a garage door) according to the wired or wireless protocol via one or more T/R modules or switches responsive to the receipt of the asynchronous signal (blocks 507, 508 and 509). The method may also include sensing signals to additional external devices, such as lights and doors, to turn on and to unlock (block 510). Finally, the method may include taking an additional action upon an actuation state of the input device 15 (which may be a reset button) (block 511), such as resuming periodic communications in block 503 or controlling operations of the additional external devices (not shown).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:
1. An electrical shut-off device, comprising:
a housing;
first and second inputs and an output disposed on the housing;
a transmission/reception (T/R) module coupled to the first input;
an input device coupled to the second input;
an electrical device coupled to the output; and
a processor in signal communication with the T/R module, the input device and the electrical device via the first and second inputs and the output, respectively,
the processor being configured to issue an instruction via the T/R module and to take an action relative to the electrical device responsive to a signal being received by the T/R module and to take an additional action in accordance with an actuation state of the input device, wherein:

the electrical device is provided as a pair of electrical devices, a first one of which is coupled to a garage door opener and a second one of which is coupled to a ventilation unit, and the processor, responsive to the signal being received by the T/R module, commands the first one of the pair of electrical devices to instruct the garage door opener to open the garage and commands the second one of the pair of electrical devices to shut down the ventilation unit to prevent harmful gas from being transported throughout a building.

2. The electrical shut-off device according to claim 1, wherein the housing is grounded and receptive of power from an alternating current (AC) line.

3. The electrical shut-off device according to claim 1, wherein the T/R module is communicative via at least one of microwave, radio frequency (RF), and Infrared (IR) networks.

4. The electrical shut-off device according to claim 1, wherein the T/R module comprises an antenna and a transceiver and is communicative with external devices via a wireless protocol.

5. The electrical shut-off device according to claim 1, wherein the input device comprises plug elements, which are receptive of plugs, a reset button, which is actuatable relative to the housing to reset an operational status of the processor, and a test button, which is actuatable relative to the housing to cause the processor to run or execute a test.

6. The electrical shut-off device according to claim 1, wherein the output and the electrical device are provided as respective pluralities of outputs and electrical devices.

7. The electrical shut-off device according to claim 1, wherein the electrical device is coupled to a garage door opener.

8. The electrical shut-off device according to claim 1, wherein the electrical device comprises at least one of a T/R module, a switch and a relay and is receptive of power from an alternating current (AC) line.

9. The electrical shut-off device according to claim 1, wherein the processor is configured to periodically communicate with a network via the T/R module and to determine that the signal is an alarm in accordance with the signal being asynchronously received from the network.

10. The electrical shut-off device according to claim 1, wherein the additional action comprises one of resuming periodic communications with a network via the T/R module or controlling operations of external devices.

11. A method of operating an electrical shut-off device comprising a transmission/reception (T/R) module, which is communicative according to a wireless protocol via at least one of radio frequency (RF) and Infrared (IR) networks, and an input device, the method comprising:

periodically communicating with the at least one of the RF and IR networks according to the wireless protocol via the TR module;

receiving an asynchronous signal from the at least one of the RF and IR networks according to the wireless protocol via the TR module;

identifying the asynchronous signal as an alarm;

issuing an instruction to an external electrical device to take an action according to the wireless protocol via the T/R module responsive to receipt of the asynchronous signal and identification thereof as an alarm; and taking an additional action in accordance with an actuation state of the input device, wherein the issuing of the instruction to the external electrical device to take the action comprises:

commanding a garage door opener to open; and commanding a ventilation unit to shut down to prevent harmful gas from being transported throughout a building.

12. The method according to claim 11, wherein the identifying comprises determining that the asynchronous signal is received asynchronously relative to periodic communications.

13. The method according to claim 11, wherein the issuing of the instruction comprises issuing an instruction to the external electrical device to shut down.

14. The method according to claim 11, wherein the issuing of the instruction comprises issuing an operational instruction to the external electrical device.

15. The method according to claim 11, wherein the taking of the additional action comprises controlling operations of additional external devices.

16. The method according to claim 11, wherein the taking of the additional action comprises:

determining the actuation state of the input device; and resuming periodic communications in an event the input device is determined to have been actuated.

17. The method according to claim 16, wherein the taking of the additional action comprises controlling operations of additional external devices.

18. An electrical shut-off device, comprising:

a housing;

first and second inputs and an output disposed on the housing;

a transmission/reception (T/R) module coupled to the first input;

an input device coupled to the second input;

first and second electrical devices respectively coupled to the output, the first electrical device being coupled to a garage door opener and the second electrical device being coupled to a ventilation unit; and a processor in signal communication with the T/R module, the input device and the first and second electrical devices via the first and second inputs and the output, respectively, the processor being configured to issue an instruction via the T/R module commanding the first electrical device to instruct the garage door opener to open the garage and commanding the second electrical device to shut down the ventilation unit to prevent harmful gas from being transported throughout a building responsive to a signal being received by the T/R module and to take an additional action in accordance with an actuation state of the input device.

* * * * *